United States Patent
Thomas (10) Patent No.: US 11,794,690 B2
(45) Date of Patent: Oct. 24, 2023

(54) SEATBELT MONITORING SYSTEM

(71) Applicant: GM GLOBAL TECHNOLOGY OPERATIONS LLC, Detroit, MI (US)

(72) Inventor: Scott D. Thomas, Novi, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 240 days.

(21) Appl. No.: 17/002,199

(22) Filed: Aug. 25, 2020

(65) Prior Publication Data

US 2022/0063554 A1    Mar. 3, 2022

(51) Int. Cl.
- *B60R 22/48* (2006.01)
- *B60R 25/30* (2013.01)
- *B60R 25/102* (2013.01)
- *B60R 22/34* (2006.01)

(52) U.S. Cl.
CPC ............ *B60R 22/48* (2013.01); *B60R 22/34* (2013.01); *B60R 25/102* (2013.01); *B60R 25/305* (2013.01); *B60R 2022/4816* (2013.01)

(58) Field of Classification Search
CPC . B60R 21/00; B60R 21/015; B60R 21/01546; B60R 21/0155; B60R 21/1552; B60R 21/01556; B60R 21/01566; B60R 22/12; B60R 22/34; B60R 22/48; B60R 25/102; B60R 25/30; B60R 25/305; B60N 2/00; B60N 2/002
See application file for complete search history.

(56) References Cited

U.S. PATENT DOCUMENTS

| | | | | |
|---|---|---|---|---|
| 4,866,223 | A * | 9/1989 | Collins | H01H 3/16 200/61.58 B |
| 5,611,604 | A * | 3/1997 | Thomas | B60R 22/26 297/483 |
| 6,257,363 | B1 * | 7/2001 | Midorikawa | B60R 22/44 280/802 |
| 10,549,696 | B2 * | 2/2020 | Inoue | H04N 7/188 |
| 2008/0073141 | A1 * | 3/2008 | Jaunarena-Ferrari | B60R 22/48 280/801.1 |
| 2009/0020997 | A1 * | 1/2009 | Odate | B60R 22/46 280/801.1 |

(Continued)

OTHER PUBLICATIONS

NPL search (Jul. 12, 2022).*

(Continued)

*Primary Examiner* — Van T Trieu (57) ABSTRACT

A vehicle seatbelt monitoring system for monitoring seatbelts of a plurality of seats comprising: i) a buckle sensor for each seat configured to determine whether a seatbelt is buckled into a buckle attachment of each seat; ii) a seatbelt webbing payout sensor for each seat configured to determine an amount of seatbelt webbing that is unwound from a seatbelt retractor associated with each seat; and iii) a seatbelt monitor control module coupled to the buckle sensor and the seatbelt webbing payout sensor and configured to receive buckle state data from the buckle sensor for each seat and seatbelt payout data from the seatbelt webbing payout sensor for each seat. The seatbelt monitor control module is further configured to determine if a first seatbelt is unbuckled or not properly worn and, if so, to determine if a second seatbelt is buckled or properly worn when the first seatbelt is unbuckled or not properly worn.

20 Claims, 9 Drawing Sheets

(56) References Cited

U.S. PATENT DOCUMENTS

| | | | |
|---|---|---|---|
| 2009/0112408 A1* | 4/2009 | Kankanala | B60R 22/48 |
| | | | 701/45 |
| 2015/0251618 A1* | 9/2015 | Ghannam | B60R 22/48 |
| | | | 340/457.1 |
| 2018/0326944 A1* | 11/2018 | Cech | B60R 21/01512 |
| 2019/0152418 A1 | 5/2019 | Coughlin et al. | |

OTHER PUBLICATIONS

U.S. Appl. No. 16/253,312, filed Jan. 22, 2019, Baltaxe et al.
U.S. Appl. No. 16/389,497, filed Apr. 19, 2019, Thomas.
U.S. Appl. No. 16/389,504, filed Apr. 19, 2019, Thomas et al.
U.S. Appl. No. 16/448,932, filed Jun. 21, 2019, Baltaxe et al.
U.S. Appl. No. 16/679,659, filed Nov. 11, 2019, Thomas et al.
U.S. Appl. No. 16/836,053, filed Mar. 31, 2020, Thomas.
U.S. Appl. No. 16/871,252, filed May 11, 2020, Thomas et al.

* cited by examiner

SEATBELT MONITORING SYSTEM

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to seatbelt restraint systems and methods for detecting the status of seatbelt restraint systems, including the status of a seatbelt retractor and a seatbelt buckle. Seatbelt systems in a vehicle typically employ seatbelt retractors. A seatbelt retractor has a spool around which a seatbelt webbing is wound. The seatbelt webbing may be unwound from the spool and secured around the vehicle occupant, child restraint seat or object by inserting a latch plate coupled to the seatbelt webbing into a seatbelt buckle. The seatbelt retractor uses a spring to retract the seatbelt webbing a retractor spool. Seatbelt systems often include a sensor in the seatbelt buckle to determine whether an occupant is belted. If the occupant is unbelted, an annunciator (e.g., audible message, tone, warning light,) prompts the occupant to buckle the seatbelt.

Seatbelt retractors can also contain a seatbelt webbing payout sensor that communicates to the seatbelt webbing usually via the spool to detect the seatbelt webbing payout—extraction/retraction from the retractor. This sensor can measure distances or spool rotations.

Vehicles often include cameras that detect the position of a vehicle occupant and whether or not the occupant is wearing his or her seatbelt. However, autonomous electric vehicles operate off batteries and may lack sufficient power to run processor-executed sensing algorithms that continually process camera images of the occupant.

Some vehicles also may contain an in-seat occupancy sensor to detect occupant/object presence. These sensors are typically detect either pressure or weight on the seat but can also detect capacitance or biometric signals.

SUMMARY

It is an object of the present invention to provide a vehicle seatbelt monitoring system for monitoring seatbelts of a plurality of seats comprising: i) a buckle sensor for each seat configured to determine whether a seatbelt is buckled into a buckle attachment of each seat; ii) a seatbelt webbing payout sensor for each seat configured to determine an amount of seatbelt webbing that is unwound from a seatbelt retractor associated with each seat; and iii) a seatbelt monitor control module coupled to the buckle sensor and the seatbelt webbing payout sensor and configured to receive buckle state data from the buckle sensor for each seat and seatbelt payout data from the seatbelt webbing payout sensor for each seat. The seatbelt monitor control module is further configured to determine if a first seatbelt is unbuckled or not properly worn and, if so, to determine if a second seatbelt is buckled or properly worn when the first seatbelt is unbuckled or not properly worn.

In one embodiment, the seatbelt monitor control module is configured to determine from the seatbelt payout data at least one of a stored payout and a webbing payout from a stored static length value.

In another embodiment, the stored static length value is the smallest seatbelt payout length after the second seatbelt is buckled that is at least one of within a threshold $T1$ fixed time window after buckling and is prior to the seatbelt payout increasing a threshold $L1$ amount.

In still another embodiment, the threshold $L1$ amount comprises one of a fixed length or a percentage.

In yet another embodiment, the seatbelt monitor control module is configured to determine from the seatbelt payout data at least one of stored payout and a webbing payout from an adjusted static length value.

In a further embodiment, the adjusted static length value is the smallest seatbelt payout length that occurs in the last threshold $T2$ time duration.

In a still further embodiment, the adjusted static length value is the smallest seatbelt payout length that is at least one of not a threshold $L2$ amount smaller than the stored static length and not a threshold $L3$ amount larger than the stored static length.

In a yet further embodiment, if the seatbelt webbing payout falls outside the window between the threshold $L2$ amount and the threshold $L3$ amount, the seatbelt monitor control module resumes determining the adjusted static length calculation when the payout returns to a value between the $L2$ and $L3$ amounts either immediately or after a $T3$ duration between $L2$ and $L3$ has been exceeded.

In an embodiment, the seatbelt monitor control module is activated when the seatbelt monitor control module determines a cabin camera that monitors occupants of the vehicle system is in hibernation or its view of the seatbelt routing is obscured.

In another embodiment, the seatbelt monitor control module determines when a seatbelt has been unbuckled and no other seatbelt has been buckled and, in response, at least one of: i) warns an occupant, ii) turns on a camera, iii) takes a ride action. and iv) contacts a home office.

In still another embodiment, the seatbelt monitor control module completes certain actions when a seatbelt has been unbuckled and no other seatbelt has been buckled if the stored payout was greater than a threshold.

In yet another embodiment, the seatbelt monitor control module determines when a seatbelt has been unbuckled with a stored payout and another seatbelt has been buckled with a webbing payout that is outside a threshold range when compared to the stored payout and, in response, at least one of: i) warns an occupant, ii) turns on a camera, iii) takes a ride action, and iv) contacts a home office.

In a further embodiment, the seatbelt monitor control module completes certain actions when a seatbelt has been unbuckled and another seatbelt has been buckled with a webbing payout that is outside a threshold range when compared to the stored payout if the stored payout was greater than a threshold.

In a still further embodiment, the seatbelt monitor control module determines when a seatbelt has been unbuckled with a stored payout and another seatbelt has been buckled with a webbing payout that is within a threshold range when compared to the stored payout and, in response, at least one of: i) generates a properly buckled message, ii) provides no message, iii) does not alter the ride, and iv) does not contact a home office.

In a yet further embodiment, the seatbelt monitor control module monitors buckling and routing for a seat when the occupancy sensor detects the seat is occupied and does not monitor buckling and routing for a seat when the occupancy sensor does not detect the seat is occupied.

In one embodiment, the seatbelt monitor control module adjusts at least one of the stored payout and the webbing payout based on at least one correction factor determined from at least one of a seat position difference and a guide-loop position difference.

It is another object of the disclosure to provide a vehicle seatbelt monitoring system for monitoring seatbelts of a plurality of seats comprising: i) a buckle sensor for each seat configured to determine whether a seatbelt is buckled into a buckle attachment of a seat; and ii) a seatbelt monitor control module coupled to the buckle sensor for each seat and configured to receive buckle state data from the buckle sensor. The seatbelt monitor control module is further configured to determine if a first seatbelt is unbuckled and, if so, to determine if a second seatbelt is buckled when the first seatbelt is unbuckled. If a seatbelt becomes unbuckled and no other seatbelt then becomes buckled, the seatbelt monitor control module at least one of: i) warns, ii) turns on a camera, iii) takes a ride action, or iv) contacts the home office.

In one embodiment, the seatbelt monitor control module monitors buckling for a seat when the occupancy sensor detects the seat is occupied and does not monitor buckling for the seat when the occupancy sensor does not detect the seat is occupied.

In another embodiment, the seatbelt monitor control module at least one of: i) stops a warning action, ii) stops a ride action, and iii) stops a home office contact when a seatbelt becomes buckled.

In still another embodiment, the seatbelt monitor control module at least one of: i) warns, ii) turns on a camera, iii) takes a ride action, and iv) contacts the home office when a seat is occupied after buckling.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

The present disclosure describes an apparatus and method for determining if a person is correctly restrained by tracking buckled seating positions and associated seatbelt buckle payout. This approach can be used for a "buckle to ride" or "buckle to drive" approach on autonomous vehicles and non-autonomous vehicles when a camera is hibernating during a ride or is not present or when an in-seat occupancy sensor is present or not present. The disclosed method tracks seatbelt restrained occupants from seating position to seating position via the seatbelt buckle sensor and a webbing payout sensor on the seatbelt. The method checks seatbelt buckle attachment and payout length to confirm that a once properly buckled person remains properly buckled once they re-buckle after unbuckling a seatbelt. The method can be supplemented by an in-seat occupancy sensor which can provide an occupancy signal.

Figure 1A:
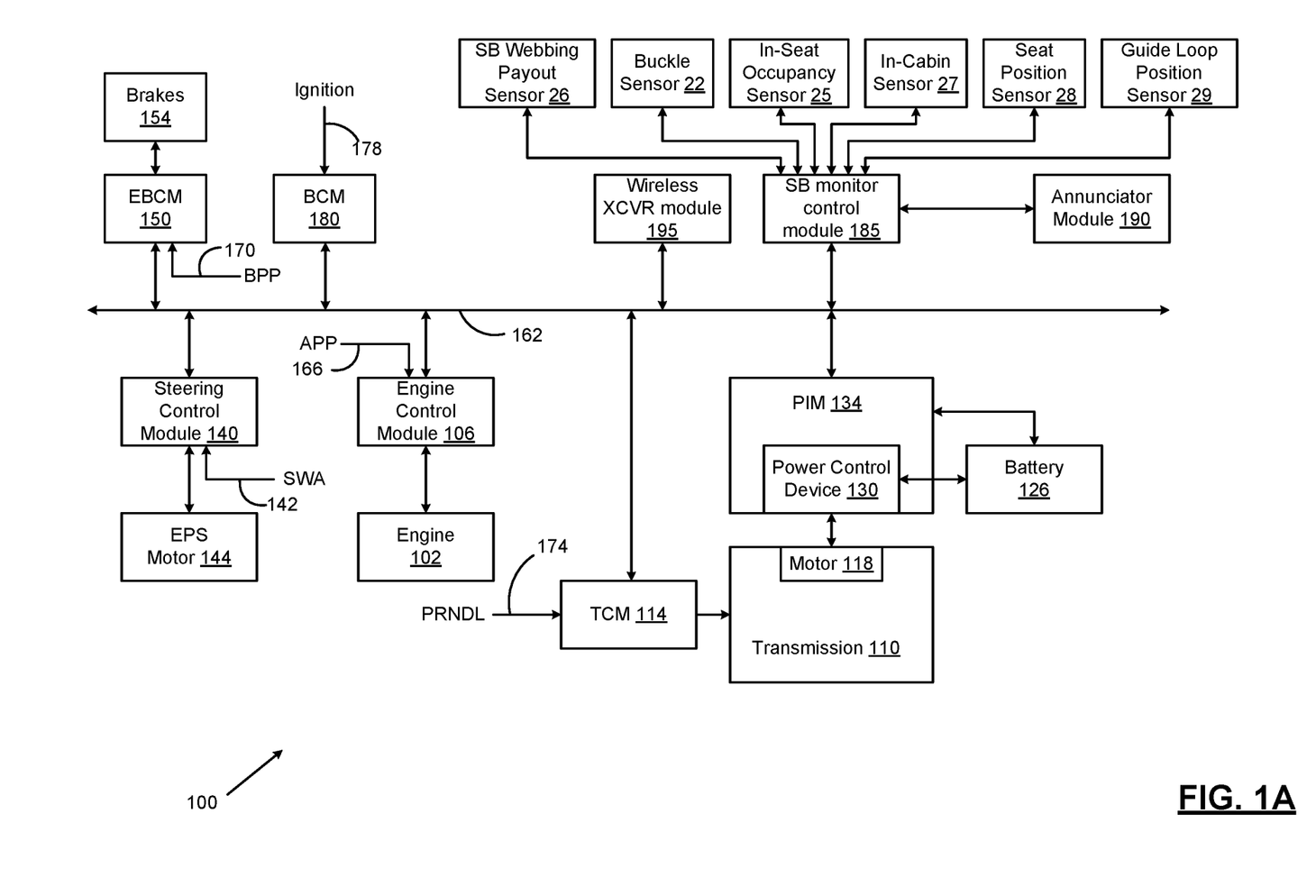
FIG. 1A is a functional block diagram of an exemplary vehicle system that includes a seatbelt monitoring system according to the principles of the disclosure.

FIG. 1A is a functional block diagram of an exemplary vehicle system 100 that includes a seatbelt monitoring system according to the principles of the present disclosure. While a vehicle system for a manually driven hybrid vehicle is shown and described, the present disclosure is also applicable to autonomously driven vehicles and non-hybrid vehicles incorporating only an internal combustion engine or only electric motors. Also, while the example of a vehicle is provided, the present application is also applicable to non-automobile implementations, such as trains, boats and aircraft.

An engine 102 combusts an air/fuel mixture to generate drive torque. An engine control module (ECM) 106 controls the engine 102 based on one or more driver or vehicle inputs. For example, the ECM 106 may control actuation of engine actuators, such as a throttle valve, one or more spark plugs, one or more fuel injectors, valve actuators, camshaft phasers, an exhaust gas recirculation (EGR) valve, one or more boost devices, and other suitable engine actuators.

The engine 102 may output torque to a transmission 110. A transmission control module (TCM) 114 controls operation of the transmission 110. For example, the TCM 114 may control gear selection within the transmission 110 and one or more torque transfer devices (e.g., a torque converter, one or more clutches, etc.).

The vehicle system 100 may include one or more electric motors. For example, an electric motor 118 may be implemented within the transmission 110 as shown in the example of FIG. 1A. An electric motor can act as either a generator or as a motor at a given time. When acting as a generator, an electric motor converts mechanical energy into electrical energy. The electrical energy may charge a battery 126 via a power control device (PCD) 130. When acting as a motor, an electric motor generates torque that supplements or replaces torque output by the engine 102. While the example of one electric motor is provided, the vehicle may include zero or more than one electric motor.

A power inverter control module (PIM) 134 may control the electric motor 118 and the PCD 130. The PCD 130 applies (e.g., direct current) power from the battery 126 to the (e.g., alternating current) electric motor 118 based on signals from the PIM 134, and the PCD 130 provides power output by the electric motor 118, for example, to the battery 126. The PIM 134 may be referred to as a power inverter module (PIM) in various implementations.

A steering control module 140 controls steering/turning of wheels of the vehicle, for example, based on driver turning of a steering wheel within the vehicle and/or steering commands from one or more vehicle control modules. A steering wheel angle sensor (SWA) monitors rotational position of the steering wheel and generates a SWA 142 signal based on the position of the steering wheel. As an example, the steering control module 140 may control vehicle steering via an EPS motor 144 based on the SWA 142 signal. However, the vehicle may include another type of steering system. An electronic brake control module (EBCM) 150 may selectively control brakes 154 of the vehicle.

Modules of the vehicle may share parameters via a controller area network (CAN) 162. The CAN 162 may also be referred to as a car area network. For example, the CAN 162 may include one or more data buses. Various parameters may be made available by a given control module to other control modules via the CAN 162.

The driver inputs may include, for example, an accelerator pedal position (APP) 166 which may be provided to the ECM 106. A brake pedal position (BPP) 170 may be provided to the EBCM 150. A position 174 of a park, reverse, neutral, drive lever (PRNDL) may be provided to the TCM 114. An ignition state 178 may be provided to a body control module (BCM) 180. For example, the ignition state 178 may be input by a driver via an ignition key, button, or switch. At a given time, the ignition state 178 may be one of off, accessory, run, or crank.

According to an exemplary embodiment of the present disclosure, the vehicle system 100 further comprises a seatbelt monitor control module 185, one or more seatbelt webbing payout sensors 26, one or more buckle sensors 22, optionally one or more in-seat occupancy sensors 24, one or more in-cabin sensors 25, one or more seat position sensors 28 (possibly more than one per seating position), one or more guideloop position sensors 29, an annunciator module 190, and a wireless transceiver (XCVR) module 195. If vehicle system 100 is operated by a ride sharing company or a rental company, the seatbelt monitor control module 185 may use the wireless transceiver module 194 to communicate with the operating company to transmit seatbelt status to the operating company so that corrective action may be taken. The seatbelt monitor control module 185 uses annunciator module 190 to notify the occupant of the status of a seatbelt. For example, the annunciator module 190 may produce: i) a warning tone or ping, ii) a spoken audio message, iii) a warning light, iv) a dashboard icon, v) a dashboard text message, vi) a haptic signal and the like.

In normal driving conditions, an occupant (or passenger) of the vehicle system 100 may unbuckle his or her seatbelt in order to be more comfortable, to reach an object, to move to a non-seating position location or to move to another seat. The occupant may then fail to re-buckle the seatbelt. Additionally, an occupant my avoid a seatbelt that crosses the torso (or chest) by lifting the chest seatbelt over his head and putting the seatbelt behind his back while still keeping the seatbelt across his waist inserted into the seatbelt buckle attachment of the seat. The seatbelt monitor control module 185 continually monitors the seatbelt webbing payout sensor 26 and the buckle sensor 22 to determine if the seatbelt has been unbuckled or misused in either situation. The seatbelt monitor control module 185 can also detect other misuse situations, such as only wearing the chest seatbelt, routing the chest seatbelt under the arm, routing the chest seatbelt on the wrong side of the head, routing the chest seatbelt off the shoulder with additional slack, holding out the seatbelt, or clipping it in an extended state to introduce more slack. The seatbelt monitor control module 185 uses the seatbelt buckle sensor and the payout length to confirm that a once properly buckled person remains properly buckled after they re-buckle the seatbelt.

According to the principles of the present disclosure, the seatbelt monitor control module 185 may determine a stored payout that is either a stored static length value or an adjusted static length value as hard coded in to the algorithm or a calibratable selection. The stored payout is recorded in memory after the seatbelt has been buckled and is retained in memory after the seatbelt has been unbuckled so that it can be compared to the payout after a seatbelt has been buckled. The "stored static length value" is the smallest seatbelt payout length after the seatbelt is buckled that: A) is within a threshold T1 fixed time window (in seconds) after buckling; and B) is prior to the seatbelt payout increasing a threshold L1 amount (e.g., a fixed length or percentage). For example, the T1 fixed time window may be 5 seconds and the L1 amount may be 20 millimeters.

The "adjusted static length" is the smallest seatbelt payout length that: A) occurs in the last threshold T2 time window (in seconds) (i.e., a continuously moving time window of T2 duration); B) is not a threshold L2 amount (fixed length or percentage) smaller than the stored static length; and C) is not a threshold L3 amount (fixed length or percentage) larger than the stored static length. If the seatbelt webbing payout falls outside the window between the L2 and L3 amounts, the adjusted static length calculation is resumed when: i) the payout returns to within the length window between the L2 and L3 amounts; and ii) the payout has been within this length window for a threshold T3 duration (in seconds). The adjusted static length compensates for certain actions by the occupant that affect the stored static length value, such as: i) tightening the seatbelt over a bulky winter jacket (results in a smaller adjusted static length, ii) moving in the seat (causes a tightened seatbelt to relax around a bulky winter jacket, resulting in a larger adjusted static length), or ii) leaning in the seat which, depending on the direction of the lean or shift, can either result in a larger or smaller adjusted static length. The stored payout for adjusted static length is the last adjusted static length value prior to unbuckling.

Figure 1B:
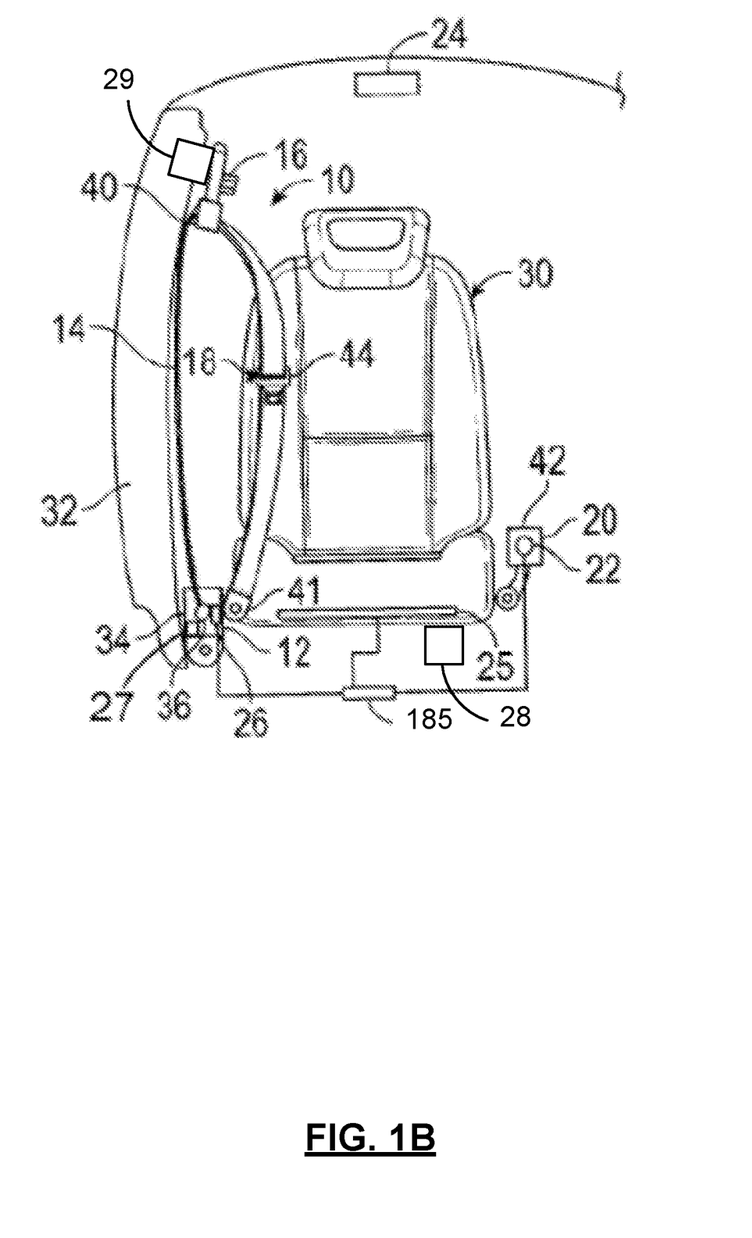
FIG. 1B is a view of a passenger seat in the interior of the vehicle according to an embodiment of the disclosure.

FIG. 1B is a view of a passenger seat in the interior of the vehicle according to an embodiment of the present disclosure. Referring to FIG. 1B, a safety restraint system 10 for a motor vehicle is illustrated, in accordance with an embodiment of the invention. Safety restraint system 10 includes a seatbelt retractor 12, a seatbelt webbing 14, a guideloop 16, a latchplate 18, a buckle 20, a seatbelt buckle sensor 22, a remote occupancy sensor 24, an in-seat occupancy sensor 25, a seatbelt webbing payout sensor 26, an automatic locking retractor (ALR) sensor 27, one or more seat position sensors 28 (if a moving seat is present), and one or more guideloop position sensors 29 (if a moving guideloop is present). Seatbelt retractor 12 may include an automatic locking mechanism and, thus, would be referred to as an automatic locking retractor. If seatbelt retractor 12 contains an ALR, seatbelt retractor 12 also includes ALR sensor 27 that senses the engagement and disengagement of the automatic locking mechanism. Seatbelt retractor 12 is fixed to a structural member of the motor vehicle adjacent a vehicle seat 30. For example, seatbelt retractor 12 is bolted to the base of the B-pillar 32 or other structural member of the vehicle such as a structure behind or above the seat or in the roof. Alternatively, the seatbelt retractor 12 may be integrated with and fixedly attached to the base of the seat 30 of the motor vehicle. A frame 34 of seatbelt retractor 12 is configured to rotatably support a spool 36 for controlled rotation in the retractor 12.

A spring (not shown) is operatively attached to the retractor frame 34 at one end of the spring and to the spool 36 at another end of the spring to retract the seatbelt webbing 14 onto the spool 36 and into the retractor 12. The seatbelt webbing 14 is at least partially wound around the spool 36 to store the seatbelt webbing 14 in the retractor 12 when the safety restraint system 10 is not in use. When the safety restraint system 10 is in use the seatbelt webbing 14 is unwound from the spool 36 and pulled out of the retractor 12 by a vehicle occupant. The seatbelt webbing 14 is typically made of a woven fabric material such as woven nylon or polyester.

The seatbelt webbing payout sensor 26 is in communication with the retractor spool 36. Webbing payout sensor 26 is configured to sense the rotation of the retractor spool 36. The seatbelt monitor control module 185 receives a spool rotation signal from the webbing payout sensor 26 and is configured to determine the length of webbing payout from the rotation of the spool 36 of the retractor 12 or the amount of rotation of the spool 36. The seatbelt webbing payout sensor 26 may also be used to detect the engagement or disengagement of the automatic locking mechanism in the ALR. In addition, there may be other ways to measure payout by picking up markings on the seatbelt via a sensor such as an optical sensor so the webbing payout sensor 26 may also track webbing payout based on this approach.

Guideloop 16 is fixedly secured to the motor vehicle, generally, towards the top of the B-pillar 32 of the motor vehicle. An optional slot 40 is provided in guideloop 16 that receives and slidably engages the seatbelt webbing 14. The seatbelt webbing 14 generally extends from the retractor 12 up and along the B-pillar 32 and is threaded or routed through guideloop 16 where the seatbelt webbing 14 is directed down toward the base of the seat 30 and is secured at a terminal end 41 to a structural member of the motor vehicle or to the seat 30. Some guideloop 16 designs can have their height position adjusted via a mechanical or motorized mechanism. For designs with height adjustment, a guideloop position sensor 29 can track the guideloop 16 position. The guideloop position sensor 29 transmits a control signal to the seatbelt monitor control module 185.

The latchplate 18 has a slot 44 through which the seatbelt webbing is threaded to slidably engage the latchplate 18 with the seatbelt webbing 14. The latchplate 18 is located on the seatbelt webbing 14, generally, between the guideloop 16 and the terminal end 41 of the seatbelt webbing 14. The terminal end 41 can be located either on the seat 30 or the vehicle structure. The buckle 20 is configured to releasably capture the latchplate 18. Typically, latchplate 18 is pressed into a slot 42 in buckle 20. After the latchplate 18 is fully inserted into the buckle 20 the latchplate 18 is locked in the buckle 20. A button on the buckle 20 is depressed to release the latchplate 18 from buckle 20.

The seatbelt buckle sensor 22 is provided in the seatbelt buckle 20. Buckle sensor 22 is configured to sense the presence of the latchplate 18. Buckle sensor 22 transmits a control signal to the seatbelt monitor control module 185. The seatbelt monitor control module 185 includes a control algorithm that receives the control signal from the buckle sensor 22 and determines whether the latchplate 18 is present in the seatbelt buckle 20.

One or more occupancy sensors 24, 25 are provided to sense the presence of an occupant in the vehicle seat 30. Occupancy sensor 24 is adjacent the vehicle seat 30. Occupancy sensor 25 is disposed in the vehicle seat 30. Occupancy seat sensor 25 assess occupant presence via different means such as one or more pressure pads, weight pads, load cells, resistive pads, capacitive pads and biometric sensors. Some of the occupancy sensor 25 types cannot distinguish the difference between living animals/people and inanimate objects/car restraint seats and some can distinguish between these. Occupancy sensor 24 would assess occupant presence via different means, such as via one or more cameras, RADARs, ultra-sonic sensors, infrared sensors, and the like. Occupancy sensors 24, 25 are configured to sense the presence of a vehicle occupant in the vehicle seat 30. In addition, remotely located occupancy sensor 24 may also have additional functionality and be able to detect seatbelt webbing 14 routing, such as if this sensor was a camera that could see the webbing, seat 30 and occupant. The remotely located occupancy sensor 24 may also be able to detect occupants located in non-seating position locations and the difference between objects, child restraint seats, animals, and people. Each occupancy sensor 24, 25 transmits a control signal to the seatbelt monitor control module 185.

The seatbelt monitor control module 185 includes a control algorithm that receives the control signal from the occupancy sensors 24, 25 and determines whether the occupant is present in the vehicle seat 30. Occupancy sensors 24, 25 may detect items in the seat as occupants, animals, objects, child restraint seats and combinations of these. Occupancy sensors 24, 25 may have one or more detection thresholds to distinguish occupants, animals, child restraint seats and objects, detect the size of the occupant, detect the orientation of the child restraint seat, detect the size of the object and detect the location of the occupant relative to the seating surface of vehicle seat 30. Occupancy sensor 24 that is located adjacent the seat can also detect the seat position and the guideloop position.

The seat 30 can contain one or more seat position sensors 28. These sensor can detect seat fore-aft location, seat vertical location, seat bottom tilt, seat back tilt, and other adjustable seat parameters. Each seat position sensor 28 transmits a control signal to the seatbelt monitor control module 185.

Figure 2A:
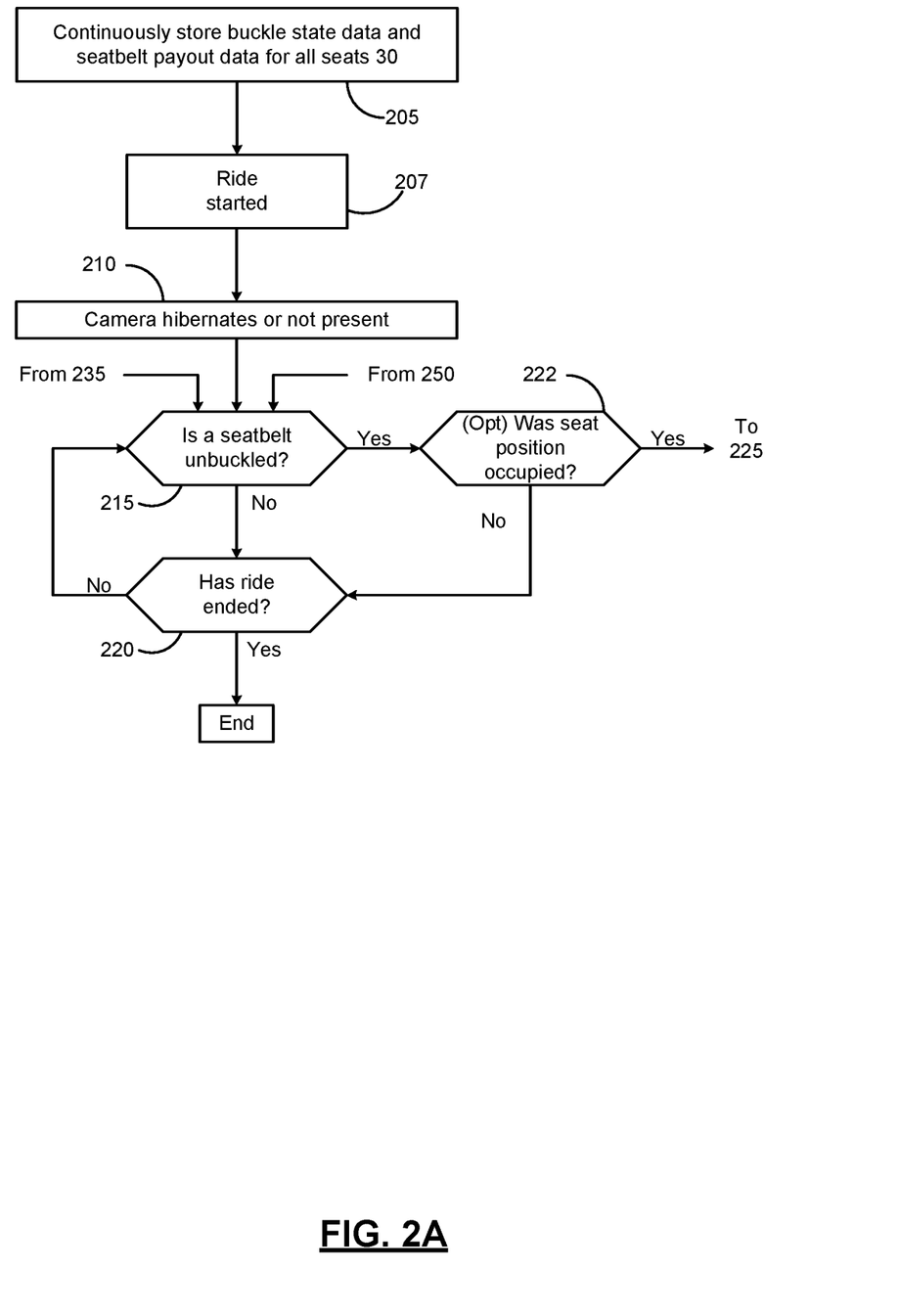
FIG. 2A is a flow diagram illustrating the operation of the seatbelt monitoring system according to an embodiment of the disclosure.
Figure 2B:
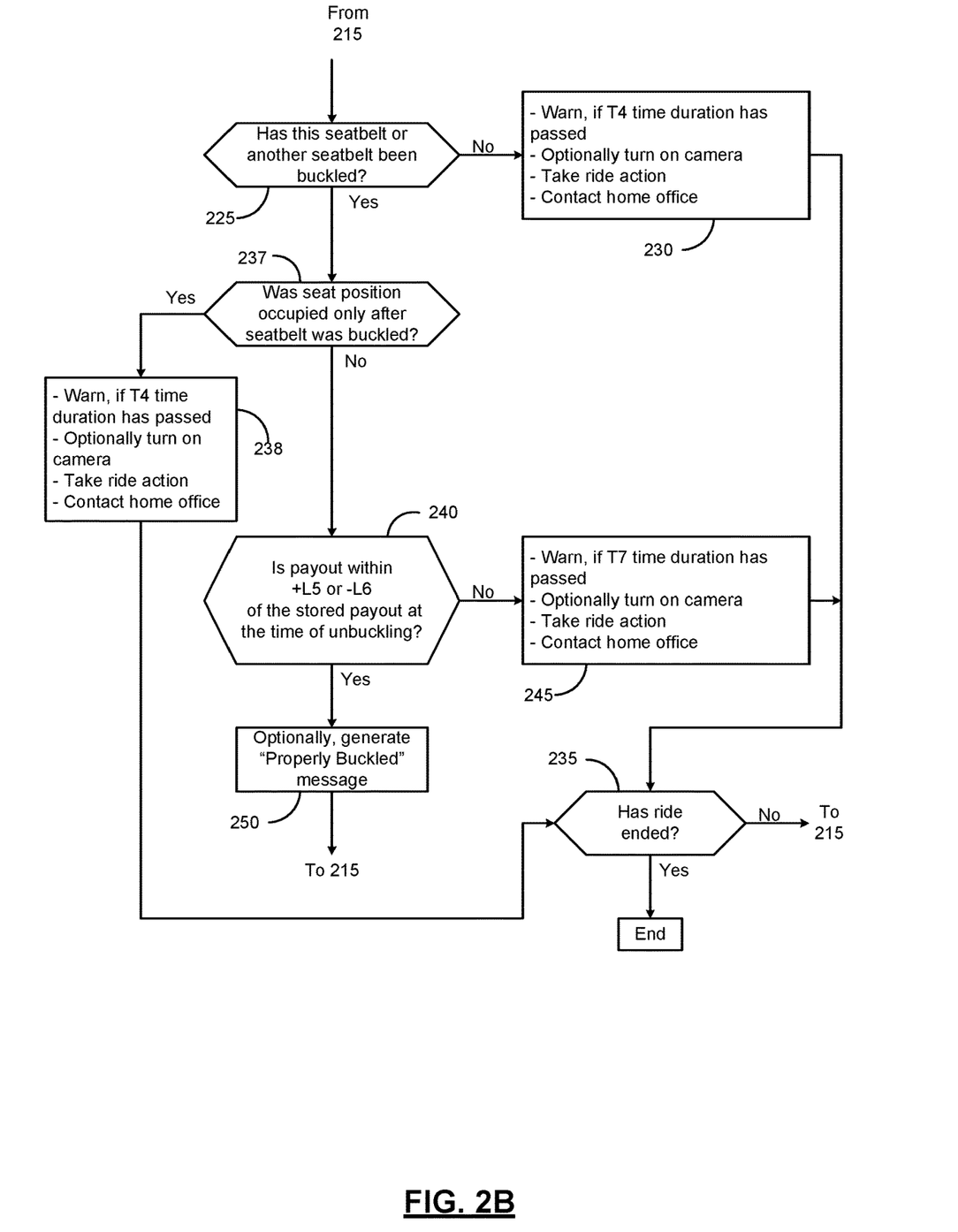
FIG. 2B is a flow diagram illustrating the operation of the seatbelt monitoring system according to an embodiment of the disclosure.

FIG. 2A is a flow diagram illustrating the operation of the seatbelt monitoring system according to an embodiment of the present disclosure. FIG. 2B is a flow diagram illustrating the operation of the seatbelt monitoring system according to an embodiment of the present disclosure. In 205, the seatbelt monitor control module 185 continuously stores seatbelt buckle state data and the seatbelt payout data whether stored static length or adjusted static length as stored payout for each seat 30. In optional box 207, the ride is started. In 210, the cabin camera enters hibernation to save power or possibly if it's view of the seatbelt partially or fully obscured. Alternatively, the cabin camera may not be present. In 215, the seatbelt monitor control module 185 determines if a first seatbelt is unbuckled. If "NO" in 215, the seatbelt monitor control module 185 in 220 determines if the ride has ended at 221. If "YES" in 220, the seatbelt monitor control module 185 stops execution. If "NO" in 220, the seatbelt monitor control module 185 returns to 215 and continues to determine if the first seatbelt is unbuckled.

If "YES" in 215, the seatbelt monitor control module 185 in 222 may optionally determine if the seat was previously occupied when the first seatbelt was unbuckled. If "NO" in 222, the seatbelt monitor control modules 185 returns to 220 to determine if the ride has ended and if then "NO", continues to determine if a seatbelt is unbuckled in 215. If "YES" in 222, the seatbelt monitor control module 185 in 225 determines if the first seatbelt or a second seatbelt has been buckled. Alternatively, if the optional operation in 222 is not performed, if "YES" in 215, the seatbelt monitor control module 185 goes directly from 215 to 225 and determines if the first seatbelt or a second seatbelt has been buckled. The operation in 225 determines if the occupant re-buckled himself or herself into the first seat or moved to a second seat.

If "NO" in 225, the seatbelt monitor control module 185 may perform in 230 one or more of several actions, including: i) if a threshold T4 time value has passed, warning the occupant that the seatbelt is unbuckled; ii) turning on the camera; iii) taking a ride action (e.g., slow down or stop the vehicle if an autonomous vehicle); iv) contacting a home office or other supervisory agent to report that the seatbelt is unbuckled and v) storing that no seatbelt has been buckled and optionally the seat has been occupied in a buffer. Thereafter, the seatbelt monitor control module 185 in 235 determines if the ride has ended. If "YES" in 235, the seatbelt monitor control module 185 stops execution. If "NO" in 235, the seatbelt monitor control module 185 returns to 215 to process other seating positions and also to process the seating position where the seatbelt was unbuckled and the seat was occupied. For this latter seating position, the condition where the unbuckled seatbelt in an occupied seat needs to be resolved by buckling or the seat becoming unoccupied in order to clear the buffer for this seating position. Otherwise the buffer condition is carried through steps 215 (seatbelt is unbuckled), 222 (seat is occupied) and 225 (no seat belt has been buckled). If "YES" in 225, the seatbelt monitor control module 185 may optionally determine in 237 if the seat position is occupied only after the seatbelt for that seat position that was buckled in 225. This detects if the seatbelt was buckled before an occupant or object is in the seat or afterward. If "YES" in 237, then seatbelt monitor control module 185 may perform in 238 one or more of several actions, including: i) warning that an occupant or possibly an object is not being restrained by the seatbelt; ii) turning on the camera; iii) taking a ride action (e.g., slow down or stop the vehicle if an autonomous vehicle); iv) contacting a home office or other supervisory agent to report that the occupant or possibly object is unrestrained and v) storing that the seatbelt was buckled but after the seat has been occupied in a buffer. Thereafter, the seatbelt monitor control module 185 in 235 determines if the ride has ended. If "NO" in 235, the seatbelt monitor control module 185 returns to 215 to process other seating positions and also to process the seating position where the seatbelt was buckled after the seat was occupied. For this latter seating position, the condition where the seatbelt that has been buckled before the seat has been occupied needs to be resolved by unbuckling/re-buckling or the seat becoming unoccupied in order to clear the buffer for this seating position. Otherwise the buffer condition is carried through steps 215 (seatbelt was initially unbuckled), 222 (seat is occupied), 225 (this seatbelt was later buckled) and 237 (seat position was occupied after the seatbelt was buckled).

If "YES" in 225 or "No" in optional step 237, the seatbelt monitor control module 185 may determine in 240 if the webbing payout (i.e. the new stored static length or adjusted static length from the just buckled seatbelt) is within +L5 threshold length or −L6 threshold length of the stored payout value at the time of unbuckling. This would indicate if the re-buckled seatbelt is or is not of a similar length to the prior unbuckled length, indicating that similar routing conditions are either present or not present. If "YES" in 240, the seatbelt monitor control module 185 optionally may take one or more of the following actions: a) generate in 250 a "Properly Buckled" message or notification (e.g., tone, audible message, flashing light, etc.) to notify the occupant that the seatbelt has been successfully buckled and routed, b) provide no message, c) do not alter the ride in any way and c) do not contact the home office. The seatbelt monitor control module 185 may then return to 215 and continue to determine if a seatbelt is unbuckled.

If "NO" in 240, the seatbelt monitor control module 185 may perform in 245 one or more of several actions, including: i) if a threshold T7 time value has passed, warn the occupant that the seatbelt is buckled but not properly routed; ii) turn on the camera; iii) take ride action (e.g., slow down or stop the vehicle); iv) contact a home office or other supervisory agent to report that the seatbelt is buckled but not properly routed and v) store that the seatbelt payout is outside the +L5 to −L6 range in a buffer. Thereafter, the seatbelt monitor control module 185 in 235 determines if the ride has ended. If "YES" in 235, the seatbelt monitor control module 185 stops execution. If "NO" in 235, the seatbelt monitor control module 185 will return to 215 to process other seating positions and also to process the seating position where the seatbelt payout was outside the +L5 to −L6 range. For this latter seating position, the condition where the seatbelt that has been buckled before the seat has been occupied needs to be resolved by adjusting the payout to be within the +L5 to −L6 range, the seatbelt being unbuckled and re-buckled, or the seat becoming unoccupied likely after unbuckling in order to clear the buffer for this seating position. Otherwise the buffer condition is carried through steps 215 (seatbelt was initially unbuckled), 222 (seat is occupied), 225 (this seatbelt was later buckled), 237 (seat position was occupied before the seatbelt was buckled) and 240 (seatbelt was outside the +L5 to −L6 range).

Note that for some seat positions the seatbelt length is the same so that the +L5 to −L6 range is directly transferable in magnitude between seating positions. For other seating positions, the seatbelt length may be different, such as for example the center seat position when compared to an adjacent outboard seat position. The center seating position typically has a seatbelt terminal end 41, buckle 20, and guideloop 16 that are positioned laterally closer to each other. Thus, an adjustment factor may be needed to adjust the +L5 to −L6 range between these seat positions. The adjustment factor can be an addition or subtraction of length, a multiplication or division of an adjustment value to these threshold lengths, or a combination of both.

Figure 3:
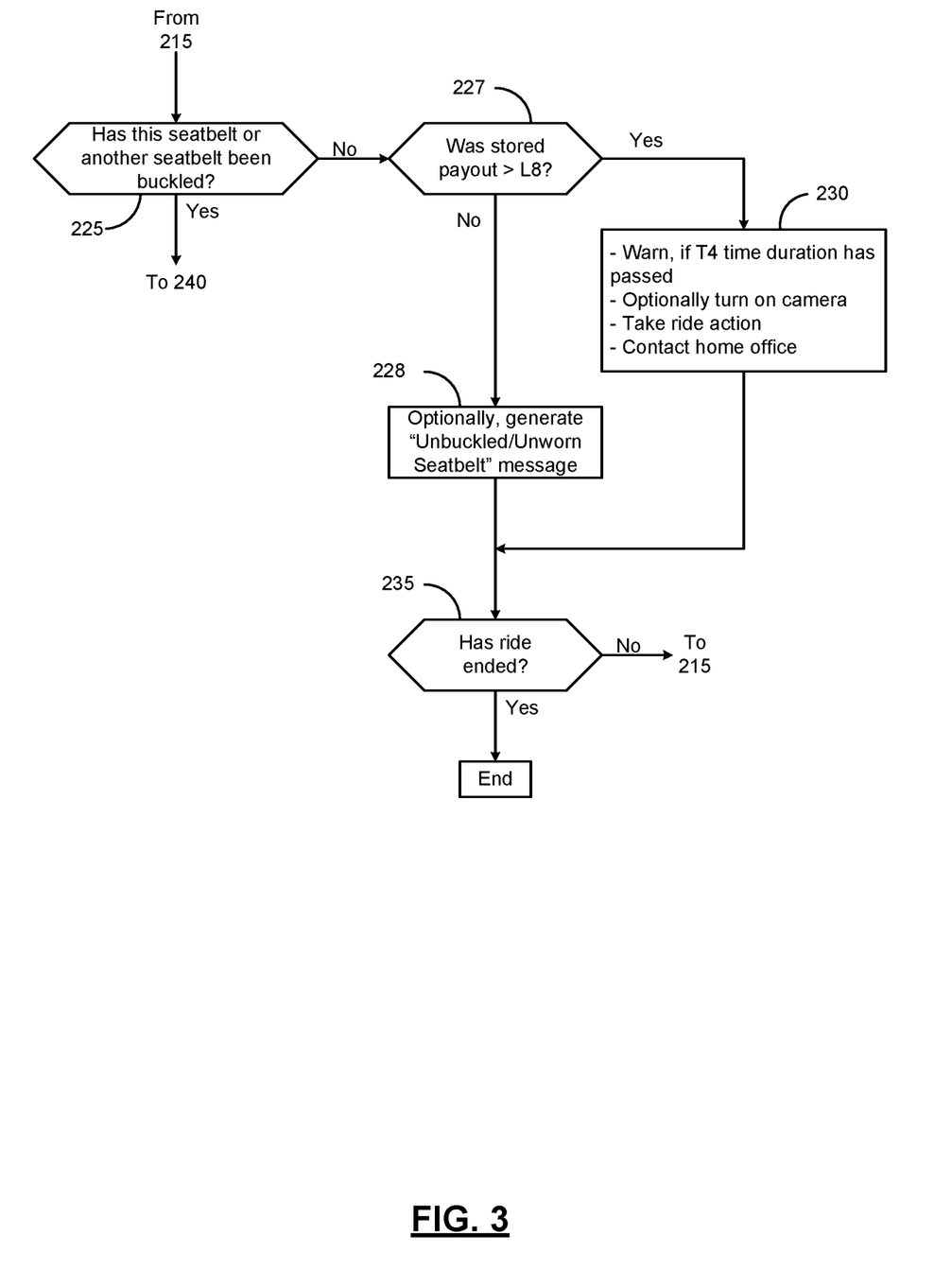
FIG. 3 is a flow diagram illustrating an optional modification to the operation in FIG. 2B according to an embodiment of the disclosure.

FIG. 3 is a flow diagram illustrating an optional modification to the operation in FIG. 2B according to an embodiment of the present disclosure. FIG. 3 provides an optional logic path that inserts a decision point 227 between the decision point 225 and the messaging 230 of FIG. 2B. FIG. 3 differs from FIG. 2A by adding new items 227 and 228 that are not in FIG. 2A. Items 240, 245, and 250 in FIG. 2A are still performed in FIG. 3, but are not shown for simplicity.

In 225, the seatbelt monitor control module 185 determines if the first seatbelt or a second seatbelt has been buckled. This would indicate that the occupant re-buckled himself into the first seat or moved to the second seat. If "NO" in 225, the seatbelt monitor control module 185 in 227 determines if the stored payout is greater than L8. This operation determines if the stored payout was large enough to indicate that the seatbelt is routed around an object or occupant. Otherwise, if the stored payout is equal to or less than L8, the seatbelt may have been buckled over an empty seat or a different latch plate may have been buckled into the seatbelt buckle.

If "YES" in 227, the seatbelt monitor control module 185 in 230 may perform one or more of several actions, including: i) if a threshold T4 time value has passed, warning the occupant that the seatbelt is unbuckled; ii) turning on the camera; iii) taking a ride action (e.g., slow down or stop the vehicle if an autonomous vehicle); iv) contacting a home office or other supervisory agent to report that the seatbelt is unbuckled and v) storing that no seatbelt has been buckled and optionally the seat has been occupied in a buffer. If "NO" in 227, the seatbelt monitor control module 185 optionally may generate in 228 an "Unbuckled or unworn seatbelt" message or notification (e.g., tone, audible message, flashing light, etc.) to notify the occupant. The seatbelt monitor control module 185 in 235 determines if the ride has ended. In this manner warnings and actions may only occur in 230 if the stored payout was a large amount indicating that the seatbelt was likely routed around an object or occupant.

Figure 4:
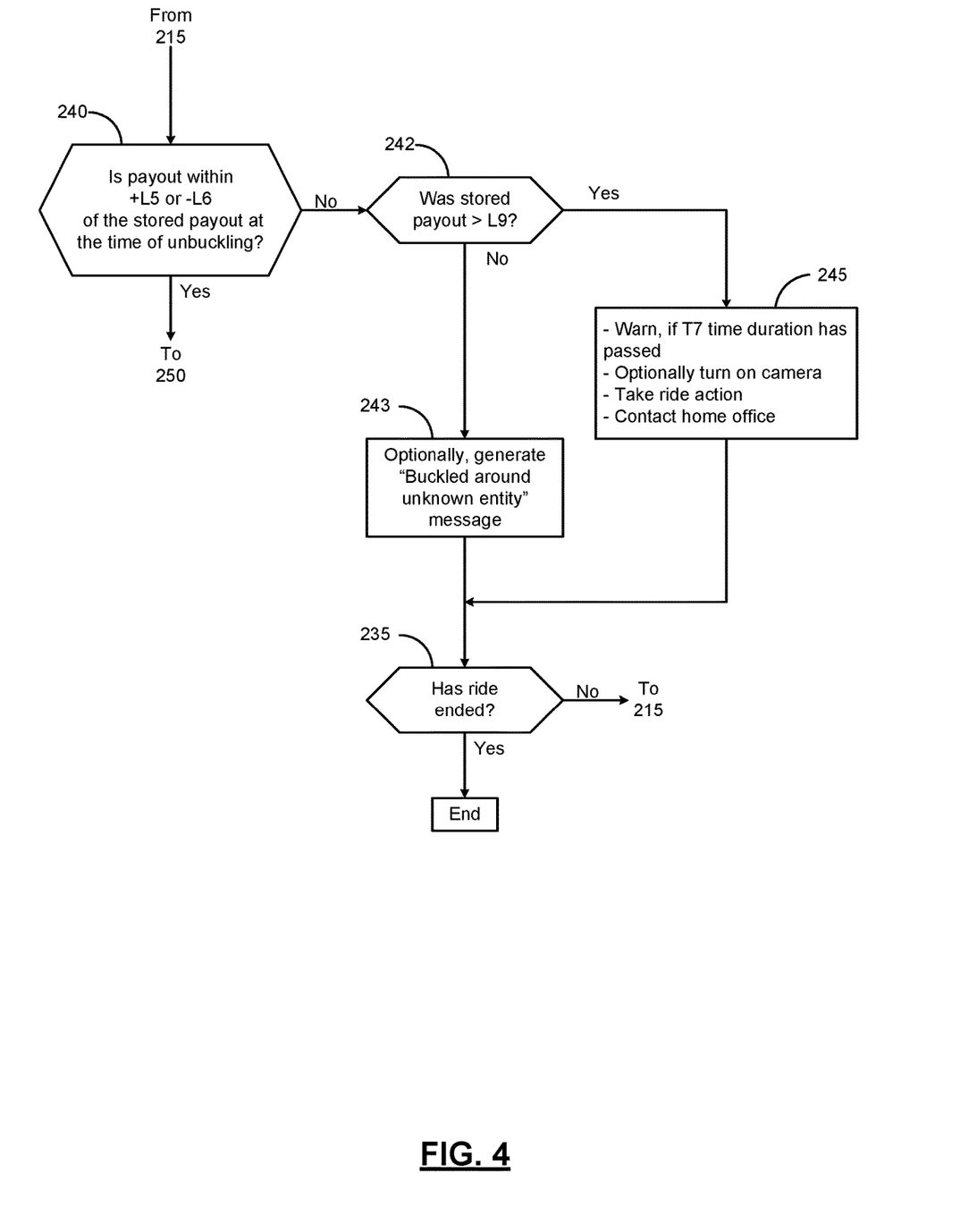
FIG. 4 is a flow diagram illustrating another optional modification to the operation in FIG. 2B according to an embodiment of the disclosure.

FIG. 4 is a flow diagram illustrating another optional modification to the operation in FIG. 2B according to an embodiment of the present disclosure. FIG. 4 provides an optional logic path that inserts decision point 242 between decision point 240 and the messaging 245 of FIG. 2B. FIG. 4 differs from FIG. 2A by adding new items 242 and 243 that are not in FIG. 2A. Items 225, 230, and 250 in FIG. 2A are still performed in FIG. 4, but are not shown for simplicity.

The seatbelt monitor control module 185 may determine in 240 if the webbing payout (i.e. the new stored static length or adjusted static length from the just buckled seatbelt) is within +L5 threshold length to −L6 threshold length of the stored payout value at the time of unbuckling. This would indicate if the re-buckled seatbelt is or is not of a similar length to the prior unbuckled length, indicating that similar routing conditions are either present or not present. If "NO" in 240, the seatbelt monitor control module 185 in 242 determines if the stored payout is greater than L9. This operation determines if the stored payout is large enough to indicate that the seatbelt is routed around an object or occupant. Otherwise, if equal to or smaller than L9, the seatbelt may have been buckled over an empty vehicle seat or a different latch plate may have been buckled into the seatbelt buckle.

If "YES" in 242, the seatbelt monitor control module 185 in 245, may perform one or more of several actions, including: i) if a threshold T7 time value has passed, warning the occupant that the seatbelt is buckled but not properly routed; ii) turning on the camera; iii) taking a ride action (e.g., slow down or stop the vehicle if an autonomous vehicle); iv) contacting a home office or other supervisory agent to report that the seatbelt is buckled but not properly routed and v) storing that the seatbelt payout is outside the +L5 to −L6 range in a buffer. If "NO" in 242, the seatbelt monitor control module 185 optionally may generate in 243 a "Buckled around unknown entity" message or notification (e.g., tone, audible message, flashing light, etc.) to notify the occupant. The seatbelt monitor control module 185 in 235 determines if the ride has ended. In this manner certain warnings and actions may only occur in 245 if the stored payout was a large amount indicating that the seatbelt was likely routed around an object or occupant.

Figure 5:
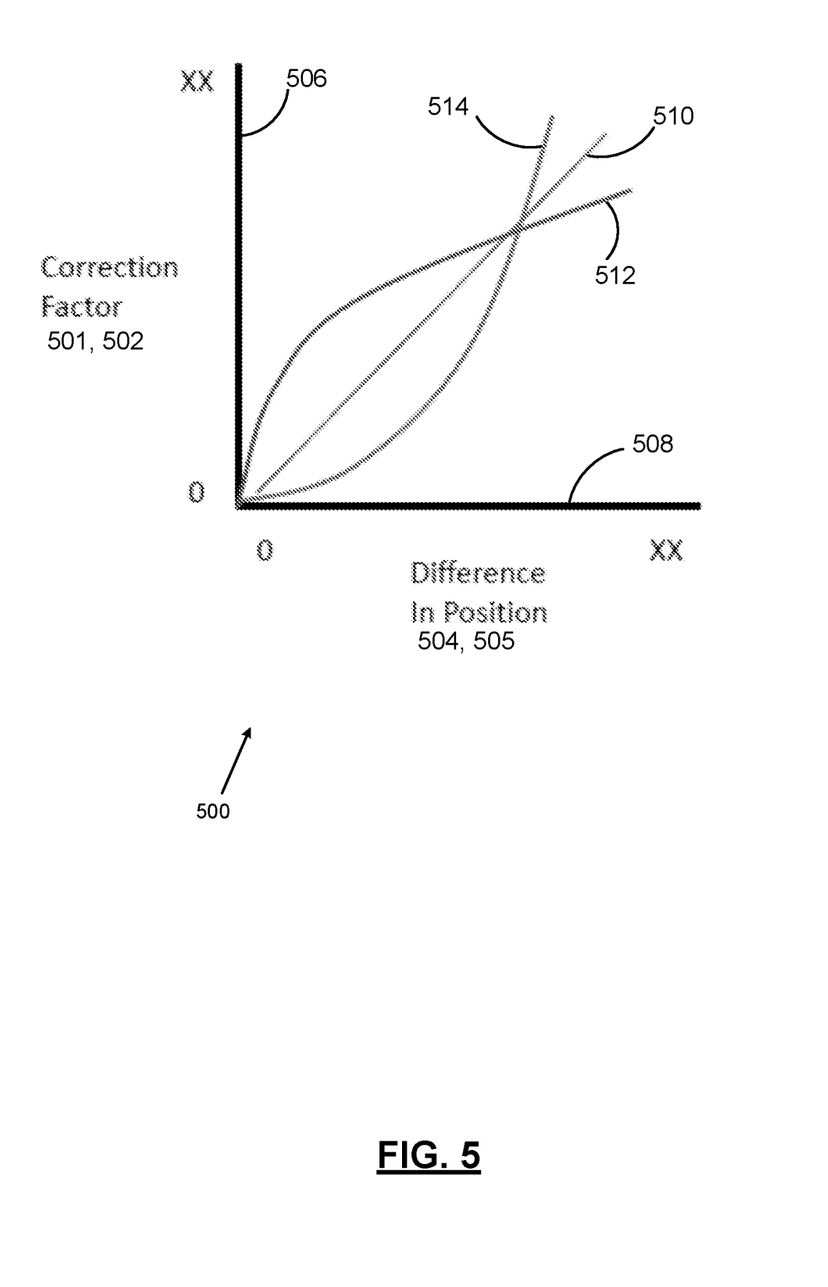
FIG. 5 illustrates a graph that includes a vertical axis for correction factors and a horizontal axis for difference in position according to an embodiment of the disclosure.

For vehicle configurations with moving seats, a seat location correction factor 501 can be applied to either the stored payout or the after buckling webbing payout based on the seat position difference for the seat where the first seatbelt was unbuckled and the seat where either the first or second seatbelt was later buckled. The difference in seat position can be determined by one or more seat position sensors 28 in the seats, the occupancy sensor 24 or by some combination of these. Note that the seat position for the first seatbelt could be moved while the seatbelt was unbuckled, so this assessment also applies to the seat position for the first seatbelt.

FIG. 5 illustrates graph 500, which includes a vertical axis 506 for seat location correction factor 501 and guideloop location correction factor 502 and horizontal axis 508 for difference in seat position 504 and guideloop position 505. Curves 510, 512, and 514 represent a few exemplary one of many possible correction approaches. From graph 500, it is easy to determine a correction factor 501, 502 from a difference in position 504, 505. Note that a different curve 510, 512, 514 can be used for each correction factor 501, 502 that is determined, including correction factors 501A, 501B, 501C, etc.

Figure 6:
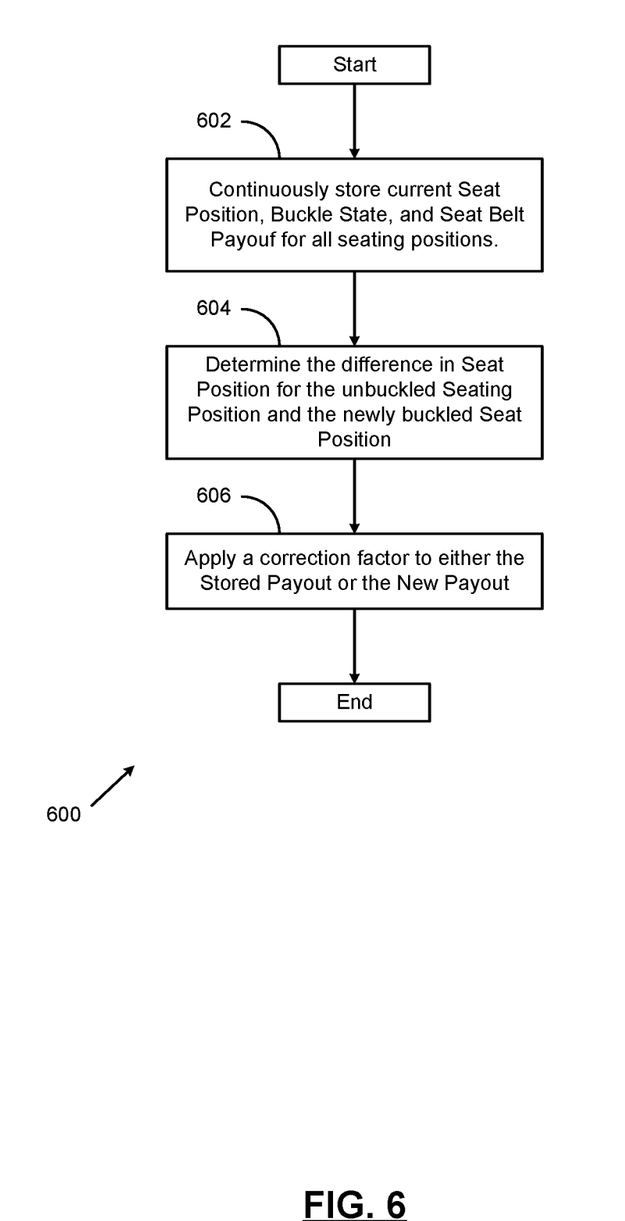
FIG. 6 illustrates a method that shows how a correction factor may be applied according to an embodiment of the disclosure.
Figure 7:
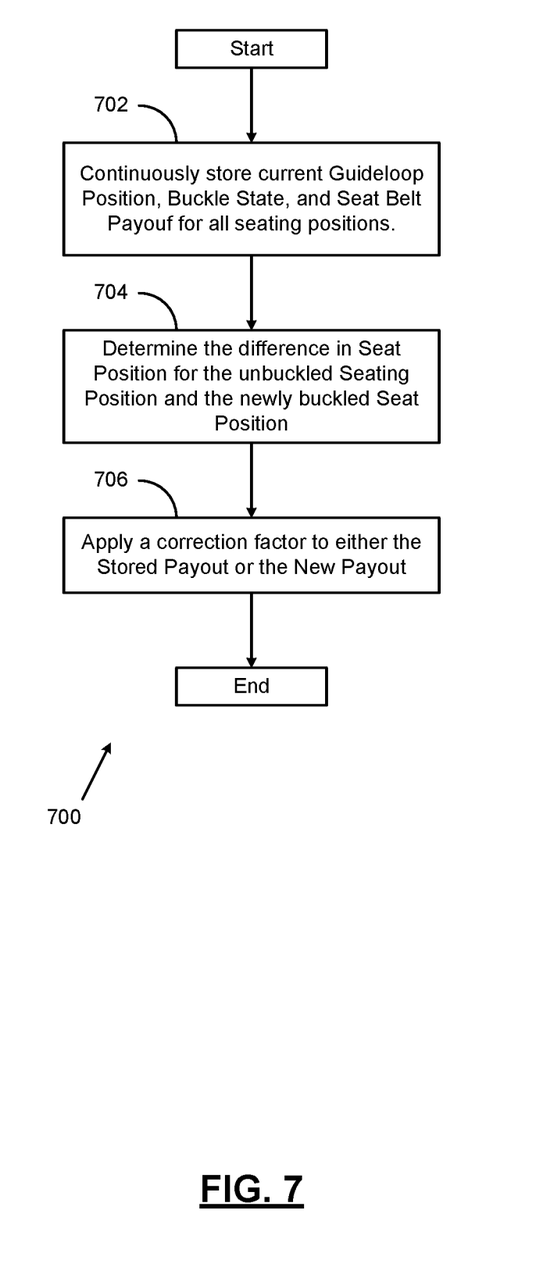
FIG. 7 illustrates a method showing how a correction factor may be applied according to an embodiment of the disclosure.

In the descriptions of FIG. 6 and FIG. 7, that follow, the threshold values L1, T1, L2, T2, L3, T3, T4, L5, L6, T7, L8 and L9 may all be hard coded into the logic herein or may be separate calibratable inputs that can be adjusted outside the hard code.

FIG. 6 illustrates a method 600 that shows how a correction factor may be applied. In 602, the seat position, buckle state and stored payout are stored for all seating positions. In 604, the difference in seat position is determined for the recently unbuckled seating position and the recently buckled seat position. A seat location correction factor 501 is then applied at 606 based on the difference between seating positions. The correction factor 501 can be determined from graph 500, from a look-up table, or from a formula. One or more correction factors 501A, 501B, 501C, etc., may be determined for each possible seat movement such as seat fore-aft movement, seat vertical movement, seat bottom tilt movement, etc. or an overall correction factor can be determined which could be the multiplication of the correction factors for each movement.

In this manner, the stored payout or the webbing payout for the recently buckled seatbelt (such as a first or second seatbelt) can be adjusted by the correction factor by either dividing it or multiplying it to one of these payout values so that a direct comparison of payout length that is corrected for seat position can be made. For vehicle configurations with moving guideloops, a guideloop location correction factor 502 may be applied to either the stored payout or the after buckling webbing payout based on the guideloop position difference for the seat where the first seatbelt was unbuckled and the seat where the first or second seatbelt was later buckled. The difference in guideloop position can be determined by one or more guideloop position sensors 29, the occupancy sensor 24 or by some combination of these. Note that the guideloop position for the first seatbelt could be moved while the seatbelt was unbuckled, so this assessment also applies to the seat position for the first seatbelt.

FIG. 7 illustrates method 700 showing how a correction factor may be applied. In 702, the guideloop position, buckle state and stored payout are stored for all seating positions. In 704, the difference in guideloop position is determined for the recently unbuckled seating position and the recently buckled seat position. A guideloop location correction factor 502 is then applied at 706 based on the difference between guideloop positions. The guideloop location correction factor 502 can be determined from graph 500, from a look-up table, or from a formula. In this manner, the stored payout or the webbing payout for the recently buckled seatbelt (such as for a first or second seatbelt) can be adjusted by the guideloop location correction factor 502 by either dividing it or multiplying it to one of these payout values so that a direct comparison of payout length that is corrected for guideloop position can be made.

It is possible to have both a seat location correction factor 501 for seat movement and a guideloop location correction factor 502 for guideloop movement. An overall correction factor 503 can then be used by multiplying seat location correction factor 501 and guideloop location correction factor 502 together and this can then be used to adjust either the stored payout or the webbing payout for the recently buckled seatbelt by either dividing or multiplying it to one of these payout values.

Note that for the method disclosed in this application, it is implied that the seatbelt control module 185 keeps track of which seating positions have a buckled seatbelt and which seating positions have an unbuckled seatbelt so that the number of buckled and unbuckled seatbelts from the start of the ride through the ride to the end of the ride are known. The number of seatbelts that are buckled at the beginning of the ride should match the number during the ride otherwise the method will take action. Variants of this method only look for the quantity of buckled and unbuckled seatbelts for occupied seat positions and variants of this method also track payout length for the buckled seating positions that are being tracked. In this manner the seatbelt control module 185 can keep up to date seatbelt usage, seat occupancy and seatbelt payout accounting and the associated past history of these measurements for each seating position.

Within this document, the first seatbelt can refer to a seatbelt that was recently unbuckled, regardless of which of several seat positions this seatbelt is located and the second seatbelt can refer to a different seatbelt other than the first seatbelt regardless of which of several seat positions this seatbelt is located. Thus, the terms "first seatbelt" and "second seatbelt" do not refer to specific seatbelt locations within a vehicle.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure. It should also be understood that steps in the embodiments can also be eliminated. For instance, all of the routing based assessments and actions can be eliminated so that only buckling and possibly occupancy are monitored and acted upon with actions.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A vehicle seatbelt monitoring system for monitoring seatbelts of a plurality of seats comprising:
   a buckle sensor for each seat configured to determine whether a seatbelt is buckled into a buckle attachment of each seat;
   a seatbelt webbing payout sensor for each seat configured to determine an amount of seatbelt webbing that is unwound from a seatbelt retractor associated with each seat based on one of: a length of webbing payout from rotation of a retractor spool and an amount of rotation of the retractor spool; and
   a seatbelt monitor control module coupled to the buckle sensor and the seatbelt webbing payout sensor and configured to receive buckle state data from the buckle sensor for each seat and seatbelt payout data including the amount from the seatbelt webbing payout sensor for each seat, wherein the seatbelt monitor control module is further configured to, based on the buckle state data and the seatbelt payout data and one of (a) without the vehicle including a camera and (b) the vehicle including a camera that is hibernating, one of:
   determine if a first seatbelt is unbuckled and if so, to determine if a second seatbelt is buckled and properly worn when the first seatbelt is unbuckled;
   determine if a first seatbelt is unbuckled and if so, to determine if the first seatbelt is rebuckled and properly worn;
   determine an unbuckled seating position and a buckled seat position for one of the seats;
   determine a difference in seat position based on the unbuckled and buckled seating positions;
   determine a seat correction factor for the one of the seats based on the difference in seat position using one of a graph, a lookup table, and a formula; and
   adjust the amount of seatbelt webbing that is unwound from the seatbelt retractor for the buckled seatbelt position for the one of the seats based on the correction factor.

2. The seatbelt monitoring system of claim 1, wherein the seatbelt monitor control module is configured to determine from the seatbelt payout data at least one of a stored payout and a webbing payout from a stored static length value.

3. The seatbelt monitoring system of claim 2, wherein the stored static length value is the smallest seatbelt payout length after either the first or second seatbelt is buckled that is at least one of within a threshold T1 fixed time window after buckling and is prior to the seatbelt payout increasing a threshold L1 amount.

4. The seatbelt monitoring system of claim 3, wherein the threshold L1 amount comprises one of a fixed length or a percentage.

5. The seatbelt monitoring system of claim 3, wherein the seatbelt monitor control module is configured to determine from the seatbelt payout data at least one of stored payout and a webbing payout from an adjusted static length value.

6. The seatbelt monitoring system of claim 5, wherein the adjusted static length value is the smallest seatbelt payout length that occurs in the last threshold T2 time duration after either the first or second seatbelt is buckled.

7. The seatbelt monitoring system of claim 6, wherein the adjusted static length value is the smallest seatbelt payout length that is at least one of not a threshold L2 amount smaller than the stored static length and not a threshold L3 amount larger than the stored static length.

8. The seatbelt monitoring system of claim 7, wherein if the seatbelt webbing payout falls outside the window between the threshold L2 amount and the threshold L3 amount, the seatbelt monitor control module resumes determining the adjusted static length calculation when the payout returns to a value between the L2 and L3 amounts either immediately or after a T3 duration between L2 and L3 has been exceeded.

9. The seatbelt monitoring system of claim 1, wherein the seatbelt monitor control module is activated when the seatbelt monitor control module determines a cabin camera that monitors occupants of the vehicle system is in hibernation or its view of the seatbelt routing is obscured.

10. The seatbelt monitoring system of claim 1, wherein the seatbelt monitor control module determines that the first seatbelt and no other seatbelt has been bucked when the first seatbelt has been unbuckled and, in response, at least one of: i) warns an occupant, ii) turns on a camera, iii) takes a ride action; and iv) contacts a home office.

11. The seatbelt monitoring system of claim 10, wherein the seatbelt monitor control module at least one of: i) warns an occupant, ii) turns on a camera, iii) takes a ride action;

and iv) contacts a home office if a first seatbelt was unbuckled and either the first seatbelt remains unbuckled or no second seatbelt has been buckled and the stored payout was greater than a threshold.

12. The seatbelt monitoring system of claim 1, wherein the seatbelt monitor control module determines the first seatbelt has been unbuckled with a stored payout and either the first or second seatbelt has been buckled with a webbing payout that is outside a threshold range when compared to the stored payout and, in response, at least one of: i) warns an occupant, ii) turns on a camera, iii) takes a ride action, and iv) contacts a home office.

13. The seatbelt monitoring system of claim 12, wherein the seatbelt monitor control module at least one of: i) warns an occupant, ii) turns on a camera, iii) takes a ride action, and iv) contacts a home office if either the first or second seatbelt has been buckled with a webbing payout that is outside a threshold range when compared to the stored payout and the stored payout was greater than a threshold.

14. The seatbelt monitoring system of claim 1, wherein the seatbelt monitor control module determines the first seatbelt has been unbuckled with a stored payout and either the first seatbelt or second seatbelt has been buckled with a webbing payout that is within a threshold range when compared to the stored payout and, in response, at least one of: i) generates a properly buckled message, ii) provides no message, iii) does not alter the ride, and iv) does not contact a home office.

15. The seatbelt monitoring system of claim 1, wherein the seatbelt monitor control module monitors buckling and routing for a seat when an occupancy sensor detects the seat is occupied and does not monitor buckling and routing for a seat when the occupancy sensor does not detect the seat is occupied.

16. The seatbelt monitoring system of claim 1, wherein the seatbelt monitor control module adjusts at least one of the stored payout and the webbing payout based on at least one correction factor determined from at least one of a seat position difference and a guideloop position difference.

17. A vehicle seatbelt monitoring system for monitoring seatbelts of a plurality of seats comprising:
   a buckle sensor for each seat configured to determine whether a seatbelt is buckled into a buckle attachment of a seat;
   a seatbelt webbing payout sensor for each seat configured to determine an amount of seatbelt webbing that is unwound from a seatbelt retractor associated with each seat based on one of: a length of webbing payout from rotation of a retractor spool and an amount of rotation of the retractor spool; and
   a seatbelt monitor control module coupled to the buckle sensor and the seatbelt webbing payout sensor for each seat and configured to receive buckle state data from the buckle sensor for each seat and the amount of seatbelt webbing that is unwound from the seatbelt retractor from each seat, wherein the seatbelt monitor control module is further configured to, one of (a) without the vehicle including a camera and (b) the vehicle including a camera that is hibernating, determine if a first seatbelt is unbuckled and if so, to determine if a second seatbelt is buckled when the first seatbelt is unbuckled,
   wherein in response to a determination that the first seatbelt is unbuckled and the second seatbelt is not buckled, the seatbelt monitor control module at least one of: i) warns, ii) turns on a camera, iii) takes a ride action, or iv) contacts the home office, and
   wherein the seatbelt monitor control module is further configured to:
      determine an unbuckled seating position and a buckled seat position for one of the seats;
      determine a difference in seat position based on the unbuckled and buckled seating positions;
      determine a seat correction factor for the one of the seats based on the difference in seat position using one of a graph, a lookup table, and a formula; and
      adjust the amount of seatbelt webbing that is unwound from the seatbelt retractor for the buckled seatbelt position for the one of the seats based on the correction factor.

18. The seatbelt monitoring system of claim 17, wherein the seatbelt monitor control module monitors buckling for a seat when an occupancy sensor detects the seat is occupied and does not monitor buckling for the seat when the occupancy sensor does not detect the seat is occupied.

19. The seatbelt monitoring system of claim 17, wherein the seatbelt monitor control module at least one of: i) stops a warning action, ii) stops a ride action, and iii) stops a home office contact when a seatbelt becomes buckled.

20. The seatbelt monitoring system of claim 17 wherein the seatbelt monitor control module at least one of: i) warns, ii) turns on a camera, iii) takes a ride action, and iv) contacts the home office when a seat is occupied after buckling.

* * * * *